United States Patent [19]

Hall

[11] Patent Number: 4,669,095
[45] Date of Patent: May 26, 1987

[54] MAXIMUM DISTANCE FROM ZERO CROSSING MSK DEMODULATOR

[75] Inventor: Scott M. Hall, Ft. Worth, Tex.

[73] Assignee: Motorola, Inc., Schaumburg, Ill.

[21] Appl. No.: 780,880

[22] Filed: Sep. 27, 1985

[51] Int. Cl.$^4$ .................................... H04L 27/14
[52] U.S. Cl. .................................... 375/90; 375/96; 364/724
[58] Field of Search ............... 375/45, 47, 88, 90, 375/95, 99, 96, 82; 455/35, 36; 370/110.3; 364/724; 328/134, 138; 179/84 VF; 340/825.73, 825.74, 825.39, 825.48

[56] References Cited

U.S. PATENT DOCUMENTS

| | | | |
|---|---|---|---|
| 3,372,375 | 3/1968 | Lem | 375/88 |
| 3,443,775 | 7/1973 | Hutchinson et al. | |
| 3,674,934 | 7/1972 | Gooding et al. | |
| 3,719,779 | 3/1973 | Wilson | |
| 3,930,121 | 12/1975 | Mathiesen | |
| 3,993,868 | 11/1976 | Balcewicz | |
| 4,028,490 | 6/1977 | Epstein | 375/90 |
| 4,072,905 | 2/1978 | Keelty | 329/122 |
| 4,076,956 | 2/1978 | Dogliotti et al. | |
| 4,087,752 | 5/1978 | Melvin | |
| 4,128,828 | 12/1978 | Samejima et al. | |
| 4,156,867 | 5/1979 | Bench | |
| 4,229,822 | 10/1980 | Bench | 375/81 |
| 4,246,653 | 1/1981 | Malm | 375/82 |
| 4,246,654 | 1/1981 | Malm | 375/82 |
| 4,267,591 | 5/1981 | Wissel et al. | 370/11 |
| 4,270,206 | 5/1981 | Hughes | 375/9 |
| 4,324,001 | 4/1982 | Rhodes | 375/90 |
| 4,414,675 | 11/1983 | Comroe | 375/90 |
| 4,457,005 | 6/1984 | Burke | 375/82 |
| 4,460,806 | 7/1984 | Canniff et al. | 370/110.3 |
| 4,468,752 | 8/1984 | Chatham | 364/900 |
| 4,468,794 | 8/1984 | Waters | 364/724 |

OTHER PUBLICATIONS

Atobe et al., "One Solution for Constant Envelope Modulation", Fourth International Conference on Digital Satellite Communication, Montreal, Canada, (Oct. 23-25, 1978).

Coherent Demodulator—from IEEE Transactions on Communications, Jun. 1972, pp. 429 through 435, by DeBuda.

The Effect of Tandem Band and Amplitude Limiting on the Eb/No Performance of Minimum (Frequency) Shift Keying (MSK), by H. Robert Mathwich—from Transactions on Communications, vol. COM-22, No. 10, Oct. 1974, pp. 1525 through 1539.

Digital Phase Sampling for Microcomputer Implementation of Carrier Acquisition & Coherent Tracking—from IEEE Trans. on Comm., vol. COM28, No. 8, Aug. 1980, by Charles R. Cahn & Leimer.

Filtering in the Time and Frequency Domains—by Herman J. Blinchikoff and Anatol I Zverev, (Westinghouse Electric Corporation), a Wiley Interscience Publication—pp. 72 and 73.

An Illustration of the MAP Estimation Method for Deriving Closed-Loop Phase Tracking Topologies: The MSK Signal Structure—by Richard W. D. Booth.

MC6801 Reference Manual, Motorola Microprocessor Operations, Austin, Texas; First Edition, 1980, pp. 1-8 through 1-10.

*Primary Examiner*—Benedict V. Safourek
*Attorney, Agent, or Firm*—Edward M. Roney; Donald B. Southard

[57] ABSTRACT

A maximum distance from zero-crossing demodulation method for MSK or OK-QPSK signals is disclosed which utilizes the zero-crossing information for establishing a bit edge reference and an optimum sampling point situated essentially midway between the zero-crossings of the higher of the two incoming signalling tones. This method is able to provide improved noise immunity over other known methods by at least an additional 10 degrees of phase margin while conserving processor steps during the phase detection process.

17 Claims, 9 Drawing Figures

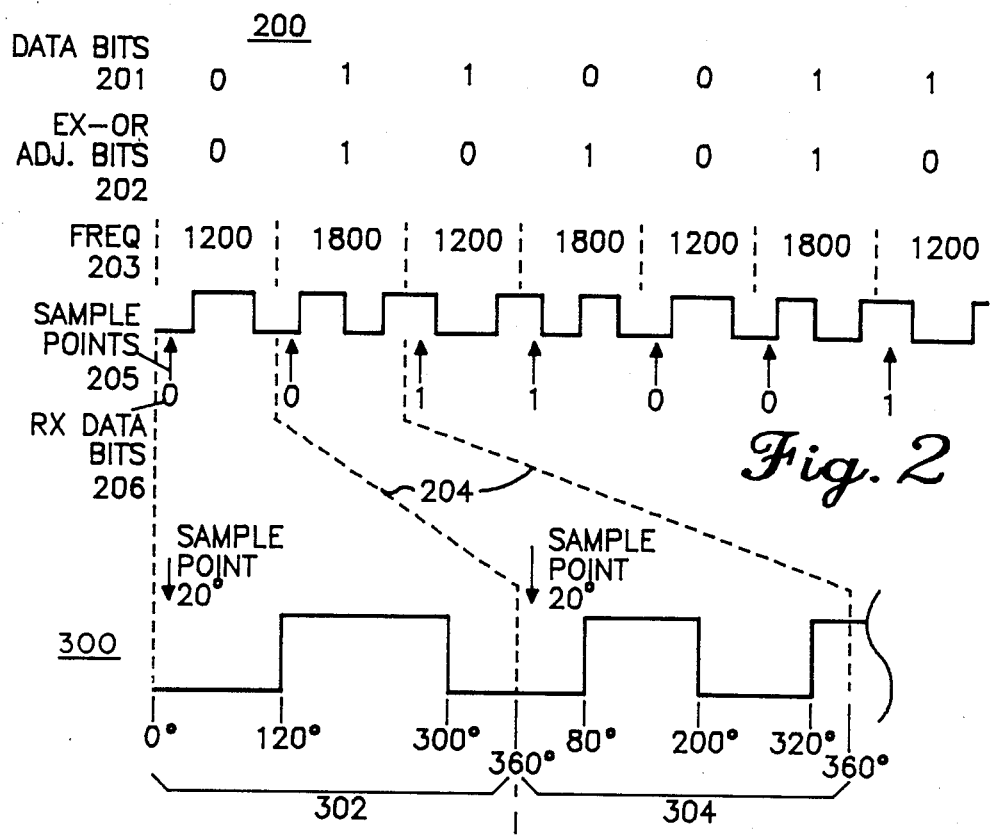
Fig. 2
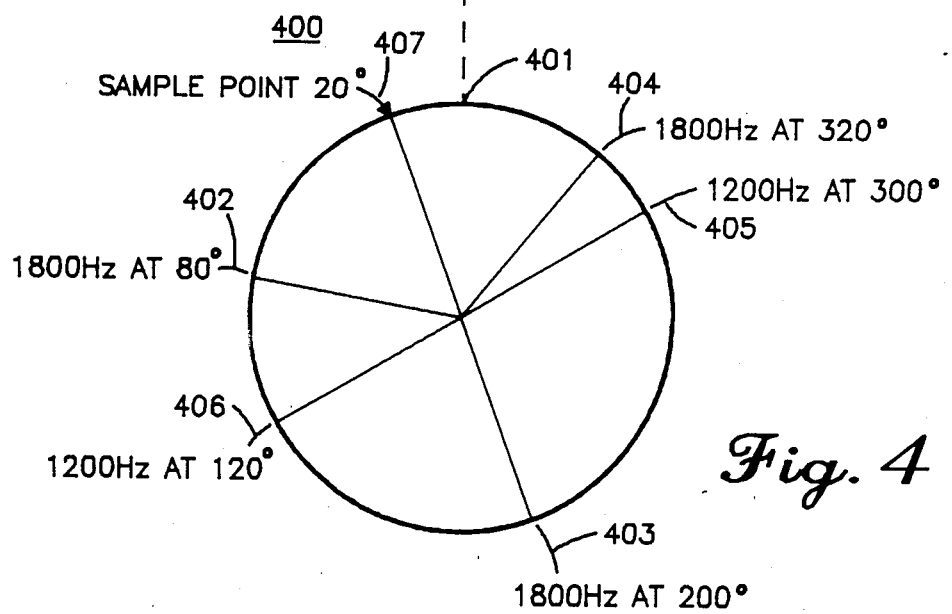
Fig. 3
Fig. 4

MAXIMUM DISTANCE FROM ZERO CROSSING MSK DEMODULATOR

BACKGROUND OF THE INVENTION

The present invention relates generally to coded signal demodulators, and more particularly to a minimum shift-keyed and offset-keyed quadrature-phase-shift-keyed signal demodulator that may be advantageously utilized in data communication systems.

A type of frequency-shift-keying commonly referred to as minimum-shift-keying (MSK) is particularly well suited for use in radio communications systems since the spectral energy is more easily contained within the limited bandwidth available than other binary frequency or phase-shift-keying modulations. An MSK signal is a continuous-phase-frequency-shift-keying (CPFSK) between one signalling tone and another signalling tone depending upon the value of a binary digit or bit. For example, a mark or binary one may be characterized by modulation with a 1200 Hz signalling tone, and a space or binary zero may be characterized by modulation with an 1800 Hz signalling tone. The continuous phase in CPFSK indicates that the phase-frequency changes between the two signalling tones are continuous; i.e., a signalling tone begins at the same phase as that which the previous signalling tone ended.

Also, to be MSK, the deviation ratio of the CPFSK must be equal to one-half. The deviation ratio is the frequency difference between the two signalling tones divided by the rate of transmission of the bits expressed in bits per second. In the above example of CPFSK with signalling tones of 1200 Hz, the transmission speed would be 1200 bits per second to be MSK.

Since MSK is a member of the frequency-shift-keying (FSK) family, the bits can be recovered from the MSK modulated signal by using any FSK signal detector or demodulator. In binary FSK one of two signalling tones are transmitted to indicate one of two possible values for a binary digit or bit. Any device which discriminates between the two signalling tones can be employed as a signal detector, such as a frequency discriminator, the error voltage from a phase lock loop, or a delay differential detector. All three methods are in common use as MSK signal detectors.

Better signal detectors can be constructed for MSK which advantageously exploit its unique characteristics; i.e., continuous phase and deviation ratio equal to one-half. These two properties result in phase characteristics usually found in a certain type of phase-shift-keying (PSK) modulation called offset-keyed quadrature-phase-shift-keying (OK-QPSK). Although OK-QPSK modulation encodes the data bits as phase shifts of the signal at bit boundaries relative to a reference carrier rather than a frequency of the signalling tone as in FSK, a relationship between the two methods exists. Because of this characteristic, coherent OK-QPSK signal detectors are also commonly used as signal detectors for MSK. Coherent signal detectors achieve more reliable signal detection than the three non-coherent detectors described earlier. This is because coherent detectors use knowledge of the exact phase of the signalling tones to detect the transmitted bits. As such, this type of demodulator usually consists of two parts; a device which extracts the bit clock in the phase of the signalling tones, and a detector which uses the extracted signal phase. A detector which uses knowledge of the signal phase is commonly implemented by a device called a matched filter.

All of these MSK demodulators can be built with varying amounts of hardware. The more reliable coherent demodulators usually require much more hardware than the simpler non-coherent demodulators. Some of the demodulators can be implemented using digital or discrete-time techniques. However, the faster the transmission rate or the more complex the demodulator, the higher the cost of implementation. As a result, a coherent demodulator, capable of accommodating data transmission speeds over several hundred bits per second and performing other supervisory functions (as is commonly required in a mobile radio), cannot be effectively implemented using a single low-cost microcomputer with existing techniques.

SUMMARY OF THE INVENTION

Accordingly, it is an object of the present invention to provide a reliable and relatively inexpensive MSK and OK-QPSK data signal demodulator that is easily adaptable to accomodate different modulating tones and baud rates.

It is another object of the present invention to provide a reliable MSK and OK-QPSK data signal demodulator that need only operate at discrete times coinciding with zero crossings of the data signal.

It is yet another object of the present invention to provide a reference carrier recovery process and extraction apparatus for MSK and OK-QPSK data signals that can operate at discrete times at baud rates of several thousand bits per second.

It is also an object of the present invention to provide a reliable coherent MSK and OK-QPSK data signal detector that operates at the same discrete times, given the phase of the incoming data signal.

It is yet another object of the present invention to provide the same reliable demodulation for either MSK or OK-QPSK modulated signals.

It is yet another object of the present invention to provide a reliable coherent MSK and OK-QPSK data signal demodulator that minimizes microcomputer processing time and improves the noise immunity during the data signal detection process.

According to an embodiment of the present invention, a demodulator is provided which is responsive to zero crossings of a data signal modulated according to MSK or OK-QPSK for recovering the binary data contained therein. Each bit of the modulated data signal consists of one of two signalling tones having a frequency difference that is one-half of the bit rate. In the inventive demodulator, the data signal is filtered and limited transforming the zero-crossings into transitions between binary states of a limited data signal. A microcomputer is responsive to each transition of the limited data signal for initiating the inventive subroutine of the present invention and samples the sign, or polarity, of the phase of the incoming data signal to demodulate and thereby recover the original data stream. Given the unique properties of a data signal modulated according to MSK or OK-QPSK, a judicious choice of steps to establish an optimum sampling point minimizes the time required for decoding the incoming data signal and provides an improvement in the demodulation process in the presence of surrounding noise.

Upon initiating the interrupt caused by the zero-crossing of the incoming data stream, the microcomputer measures the interval between the present zero-crossing and a previous zero-crossing to determine whether to update either one of two phase locked loops internal to the microcomputer. Next, it establishes a sampling point as half-way between 1800 Hz zero-crossings. Then it checks to see whether this sample point has occurred and is optimally located. If it has occurred, then it adjusts the sample point forward a portion of the data bit time period depending upon whether the absolute difference between the sample point and the bit edge is within 70°. If the difference in absolute value is greater than 70°, it adjusts the sample point forward by means of a coarse adjustment equal to 360° plus or minus 120° depending on the sign of the difference. Given that the absolute difference between the sample point and the bit edge is less than 70°, the routine then performs a fine adjustment which reduces the difference—in this case by a factor of ⅔ths. These adjustments having taken place, the microcomputer then merely samples the sign, or polarity, of the incoming data signal to arrive at the properly-recovered data bit delayed by one data bit time period.

As a result, the present invention utilizes the necessary steps to establish the optimum point in time with which to sample incoming data signal. It then recovers the incoming data bit by recognizing the positive half cycle of the incoming data signal as a logic one, and the negative half cycle of the incoming data signal as a demodulated logic zero. This leaves the microcomputer free to perform other tasks once the optimum sampling point has been established, as the demodulating process occuring at the optimum sampling point may be accomplished by a simple storage register. The present invention not only encompasses an inventive process for recovering MSK and OK-QPSK signals, but also an inventive apparatus for an MSK and OK-QPSK signal demodulator utilizing the inventive process, which performs well in a noisy environment.

BRIEF DESCRIPTION OF THE DRAWINGS

FIG. 2 represents a waveform comprising alternating high and low tones forming a given incoming data signal stream.

FIG. 3 shows a portion of the waveform in FIG. 2 with specific timing intervals identified.

FIG. 4 is a phasor diagram useful in understanding an important aspect of the present invention.

DETAILED DESCRIPTION OF THE PREFERRED EMBODIMENT

Figure 1:
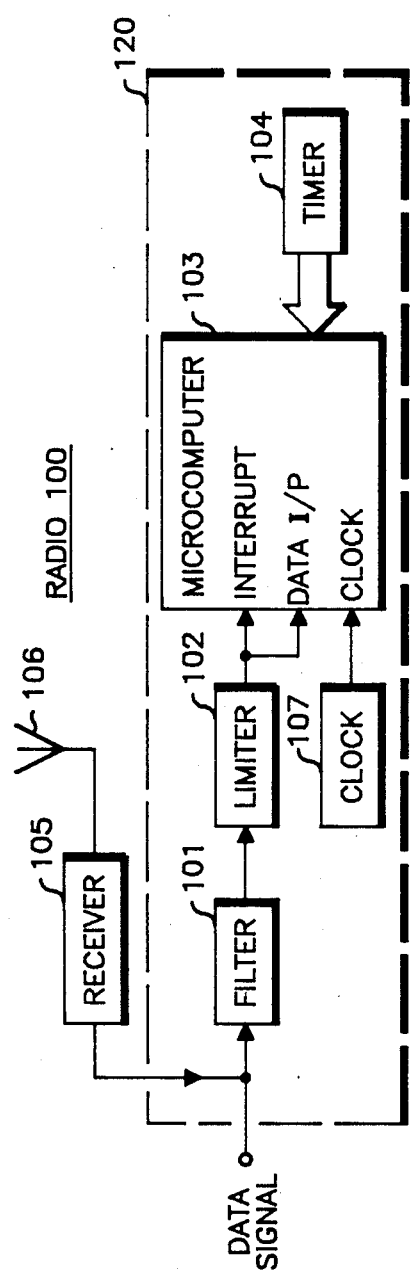
FIG. 1 is a block diagram of a radio which may advantageously utilize the demodulator of the present invention.

Referring now to the drawings, a preferred embodiment of the present invention, as depicted in FIG. 1, may exist in radio 100. Here, the demodulator consists of filter 101, driving limiter 102 feeding an interrupt port of microcomputer 103, as well as a further data input port of microcomputer 103, as shown. While the demodulator of the present invention may include a timer 104, it does not utilize the timer to drive a data input port. Instead, the demodulator of the present invention decodes the incoming data signal directly by sampling the signal at an essentially optimum point maximally distanced between zero-crossings. Receiver 105, driven by RF antenna 106 provides the input data signal, while microcomputer 103 has its own dedicated clock 107 . The elements comprising this maximum distance demodulator are depicted at 120 in FIG. 1.

In practicing the present invention it is instructive to consider a typical waveform timeline showing the incoming data signals being pre-encoded according to a predetermined sequence of bits. At 200 in FIG. 2, a sequence of data bits 201 is shown which is pre-coded by an exclusive-OR operation using adjacent bits 202 to generate an alternating sequence of low and high tones 203. In between these tones are shown bit edges 204 by means of dashed lines which indicate the transition from a low to a high tone or vice versa. Very closely approximate to these bit edges are arrows indicating sample points 205 which represent the optimum sampling point for recovery of each respective data bit. Beneath these sample points the actual receive data bits 206 as recovered by the maximum distance demodulator of the present invention are shown, and each appears delayed by one bit cycle. In FIG. 3, an expanded waveform 300 is shown indicating one full cycle of a 1200 Hz tone 302 followed by a 1½ cycle segment of the higher 1800 Hz tone 304. These are occurring at the bit rate of 1200 bits per second or 1200 baud.

Beneath FIG. 3 is a corresponding phasor diagram 400 shown in FIG. 4. Using the bit edge 401 as a reference point on this circular time chart, one observes that, as one proceeds counter clockwise around the circular chart, line segments are encountered which indicate a corresponding zero-crossing for a particular one of the two signalling tones. So, in this example, if one proceeds counter-clockwise around the chart, this corresponds to a time progression from the bit edge reference point to the right on the corresponding waveform 304 shown in FIG. 3. Thus, the first zero-crossing 402 of the 1800 Hz tone occurs at 80°, the second 403 at 200°, and the third 404 at 320°. And similarly, moving from the bit edge reference point on FIG. 3 to the left on waveform 302 indicating decreasing time, one encounters similar zero-crossings when circulating on the chart of FIG. 4 in clockwise fashion. Thus the most recent zero-crossing 405 of the 1200 Hz tone occurred at 300°, and the zero-crossing 406 prior to that at 120°.

It is important to note that, given this particular phase relationship of the 1200 Hz signal with respect to the 1800 Hz signal, an optimum sampling point 407 can be defined, and in this example, it is shown on the circular chart of FIG. 4 as being at 20° with respect to the bit edge reference 401. This is the result of the embodiment of the present invention advantageously exploiting the unique characteristics of an MSK or OK-QPSK signal. That is, given the properties of continuous phase and deviation equal to one-half, the algorithm or apparatus of the present invention first determines the time location of the optimum sampling point and then seeks to co-locate it with the bit edge reference by minimizing the time or phase difference between them. First, a determination is made whether a coarse adjustment of 360°±120° is needed based upon the difference in absolute value exceeding 70°. Theoretically, only 60° is needed, but 10° of reserve was added to minimize phase jitter. Then, if a coarse adjustment is unnecessary, a fine adjustment is made by reducing the difference (less than 70° in absolute value) by a factor of three-fourths. Unity could have been used, but the extra steps needed to implement a 4/3 scaling were undesirably long. By so doing, the maximum distance demodulator of the present invention seeks and maintains the sampling points as far from the zero-crossings of the MSK data signal as possible and affords ±60° of phase margin against noise-induced errors in the demodulator data. This is evident from the relationship between sample point 407 and 1800 Hz zero-crossings 402 and 404 as depicted in FIG. 4. The closest prior art demodulator, U.S. Pat. No. 4,414,675 assigned to the assignee of the present invention, could only achieve plus or minus 50 degrees of phase margin. Moreover, the microcomputer time for executing the task is reduced as a result of the simplified demodulation routine. The preferred embodiment of the present invention is given in the form of a software flowchart depicted at 500 in FIGS. 5a and b.

Figure 5A:
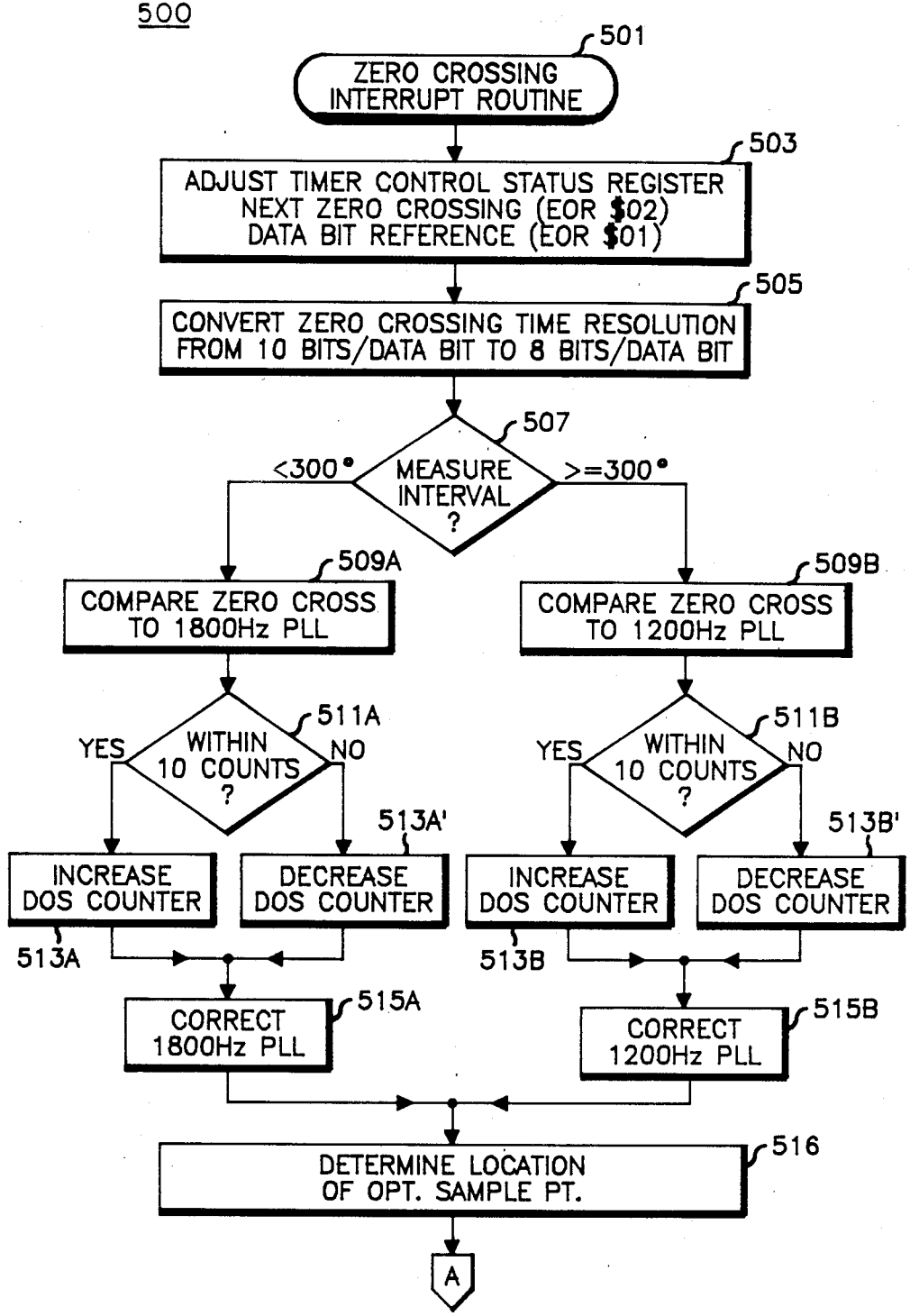
FIGS. 5a and 5b are software flowcharts indicating the various steps utilized in the demodulating process of the preferred embodiment of the present invention.

The flowchart 500 of FIGS. 5a and b is executed by microcomputer 103 in FIG. 1 whenever an interrupt is generated in response to a transition or zero-crossing of the hard limited data signal from limiter 102. Thus begins a 4-step process of the present invention; first, synchronize the phase locked loops; second, establish an optimum sampling point; third, demodulate the data bit; fourth, determine if correction is needed by use of coarse and fine adjustment limits.

Having initiated interrupt routine 501, microcomputer 103 first synchronizes the phase locked loops by first adjusting timer control status register by block 503, followed by a change time resolution via block 505 for the zero-crossing information. Then, by measuring the time interval between the zero-crossing and the data bit reference, and comparing it with 300° in decision block 507, the routine determines which one of the two phase locked loops to update. This update is accomplished by comparing the zero-crossing information with that of the proper phase locked loop in step 509A and 509B, determining whether these are within 10 counts in step 511A or 511B, incrementing or decrementing the DOS (data operated squelch) counter as shown in steps 513A or 513A' and 513B or 513B', and finally correcting this synchronization of the phase locked loop in step 515A or 515B. Moreover, the DOS counter is so named because it provides a useful output for a data operated squelch (DOS) for muting the voice audio in a mobile radio application.

Second, microcomputer 103 establishes an optimum sampling point by using the zero-crossing information obtained above and provides for the occurrence of the sampling point once per bit cycle. Next, it establishes a sampling point as half-way between 1800 Hz zero-crossings at block 516. Then, microcomputer 103 determines if the sample point has occurred at decision block 517. If it has not, as could be the case during start-up, the microcomputer returns to the initial point 501 and waits for a new interrupt. If the sample point has occurred, the process follows YES path to block 519 to demodulate the data bit.

Third, the microcomputer 103 demodulates the data bit at the sample point at 519 by detecting the data bit as a logic 1 if the sign or polarity of the signal phase is positive, and as a logic zero if the sign or polarity of the signal phase is negative. The appropriately demodulated data bit is then stored in a register at block 521.

Fourth, microcomputer 103 determines if a correction is needed in the sample point before the next data bit is demodulated. This is accomplished by having the routine calculate a bit edge reference and then compare the bit edge reference with the location of the sample point so as to minimize their difference. The bit edge reference is based upon the phase relationship of the two phase locked loops and is calculated as the following equation:

$$\text{bit edge} = 3\, \theta_{1800} - 2\, \theta_{1200}$$

where $\theta_{1800}$ is the phase of the 1800 Hz phase locked loop and $\theta_{1200}$ is the phase of the 1200 Hz phase locked loop in this example. The routine uses this information in decision block 523 to determine if: delta is less than $-70°$, where delta equals sample point$-$bit edge. If the result of decision block 523 is true then YES path is taken to block 525 which adjusts the sample point forward (360°+120°). Finally, the data bit reference is adjusted via block 527 before returning to the initializing point. If, however, the result of decision block 523 is false, then NO path is taken to decision block 529 which determines if delta is greater than or equal to +70°. If this determination is true, then YES path is taken to block 531 which adjusts the sample point forward (360°−120°). Then, the data bit reference is adjusted via block 527 before returning to the initializing point. However, if the result of decision block 529 is false, then NO path is taken to block 533 which performs a fine adjustment by reducing delta by a factor of $\frac{3}{4}$th. The above process is repeated at the baud rate, which facilitates initial synchronization as well as adaptation to distortion caused by the communications link.

Figure 6:
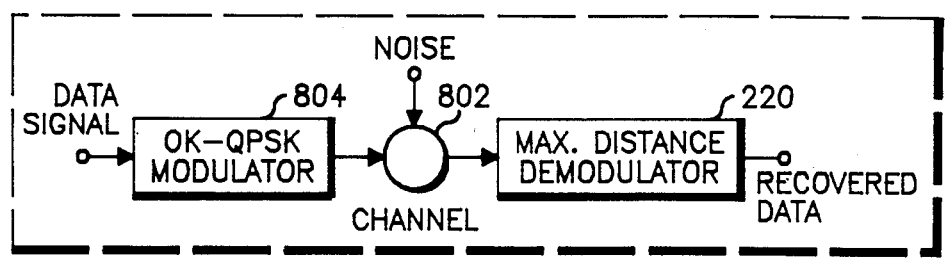
FIG. 6 illustrates a communications system employing the demodulator depicted in FIG. 1 to recover an OK-QPSK data signal.

FIG. 6 shows the maximum distance demodulator of the present invention utilized in an OK-QPSK data system for recovering the binary data in the presence of noise. The communication channel or link is depicted as block 802, which includes but does not show any necessary transmitter and receiver pair. The data signal is encoded by means of OK-QPSK modulator 804 and the data is recovered by maximum distance demodulator 220 of the present invention.

Figure 7:
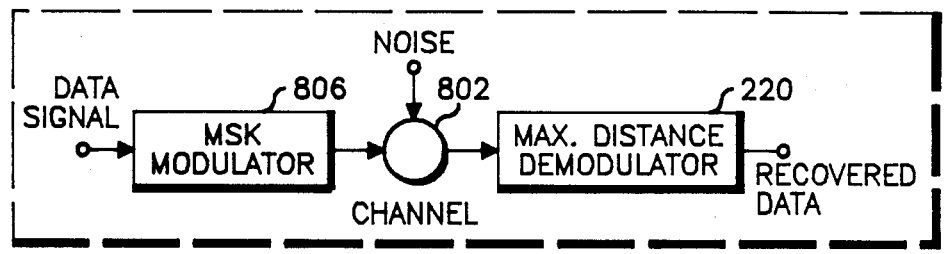
FIG. 7 illustrates a communications systems employing the demodulator depicted in FIG. 1 to recover an MSK data signal.

FIG. 7 shows the maximum distance demodulator of the present invention utilized in an MSK data system for recovering the binary data in the presence of noise. The communication channel or link is depicted as block 802, which again includes but does not show any necessary transmitter and receiver pair. Here the data signal is encoded by means of MSK modulator 806 and the data is recovered by maximum distance demodulator 220 of the present invention.

Figure 8:
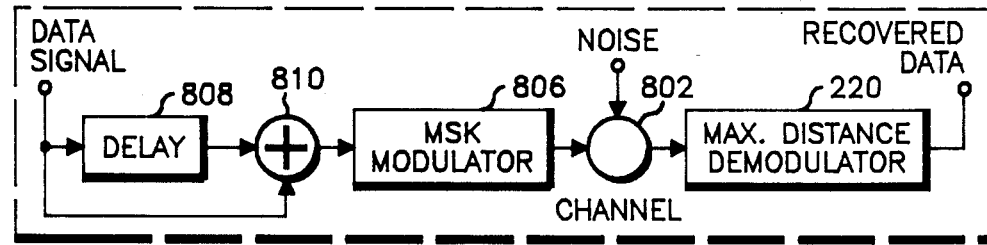
FIG. 8 illustrates another communications system employing the demodulator in FIG. 1 to recover a pre-coded MSK data signal.

FIG. 8 shows the maximum distance demodulator of the present invention utilized in a precoded MSK data system by taking the exclusive-OR of adjacent data bits in the data signal before MSK encoding to further facilitate recovering the binary data in the presence of noise. The communication channel or link is depicted as block 802, which again includes but does not show any necessary transmitter and receiver pair. Here the data signal is first pre-coded by delay stage 808 in conjunction with exclusive-OR gate 810 before encoding in MSK modulator 806. The data is then recovered by maximum distance demodulator 220 of the present invention.

In summary, the above-mentioned process for demodulating an FSK or OK-OPSK signal is able to accomplish the demodulation of the data signal stream with a minimum amount of errors by maximizing the distance between zero-crossings by synchronizing to the best ⅓rd portion of the bit cycle occurring at the baud rate. This affords the demodulator a plus or minus 60° phase margin to noise-induced errors and, because it simplifies the overall demodulation algorithm by judiciously choosing the time occurrence of the optimum sampling point, it frees the microcomputer to do other tasks rather than merely overseeing the above demodulation process.

Although the maximum distance from zero-crossing demodulation process of the present invention fully discloses many of the attendant advantages, it is understood that various changes and modifications not depicted herein are apparent to those skilled in the art. Therefore, even though the form of the above-described invention is merely a preferred or exemplary embodiment given with a practical alternate embodiment, further variations may be made in the form, construction, or arrangement of the process (or equivalent apparatus) without departing from the scope of the above invention.

APPENDIX

Figure 5B:
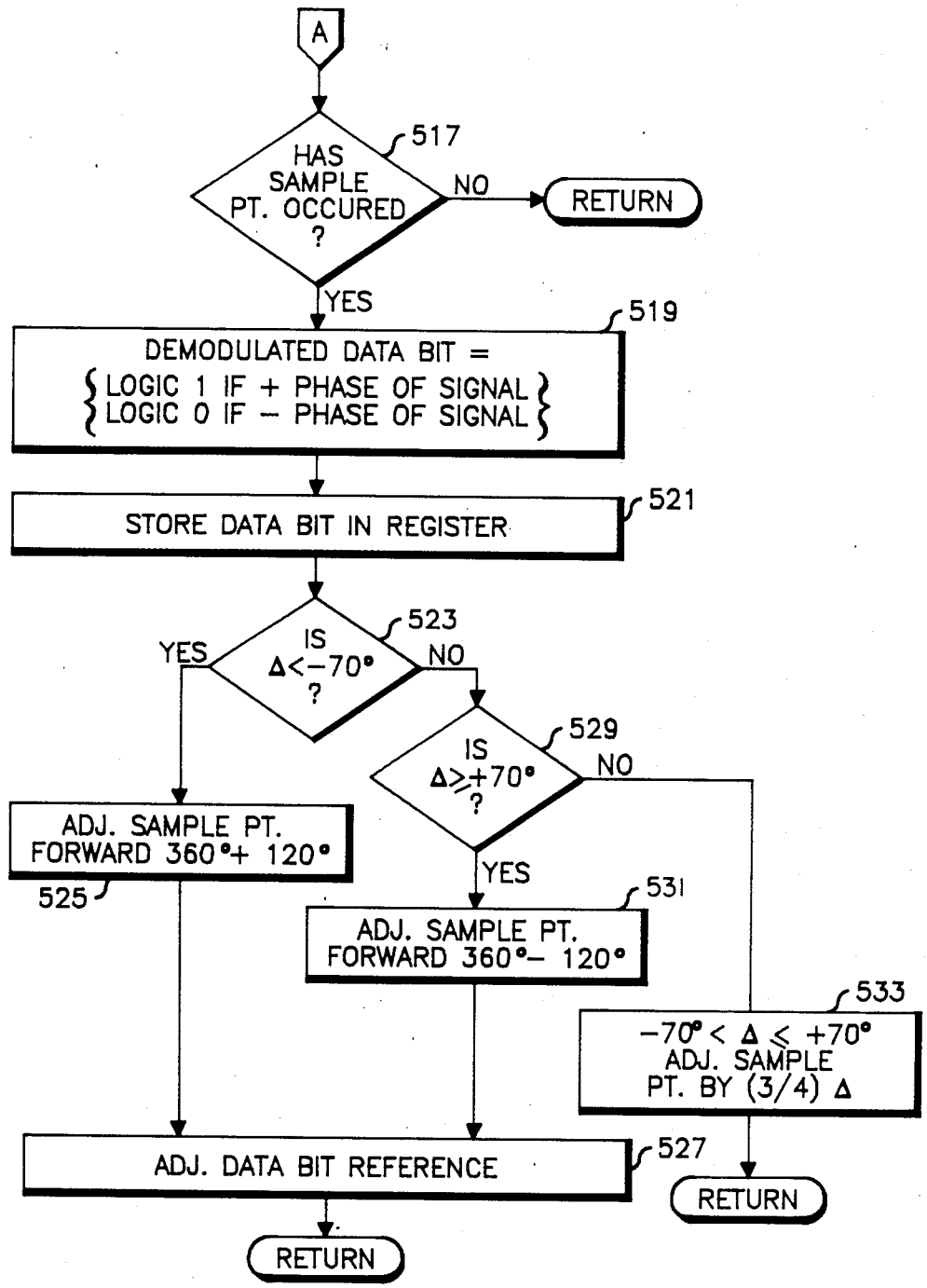

The following program has been coded from the flowcharts in FIGS. 5a and 5b in BASIC programming language, which is described in the book entitled *Basic BASIC*, by James S. Coan, published by the Hayden Book Co., Inc. Rochelle Park, N.J. 1970. The program is included to demonstrate that the flow charts in FIGS. 5a and 5b may be readily coded into any suitable programming language.

All arithmetic operations are performed modulo B. This can be performed naturally if $\log_2 B$ is the number of bits used to express each variable, i.e., eight-bit variables and B=256. Since B is $2^8$, any suitable eight-bit microcomputer can be utilized. On any machine modulo B arithmetic may be simulated by restricting all arithmetic results in a range of size B. In the following example in BASIC, an arithmetic result may be restricted to the range $(B/2 > x \geq -B/2)$ by the lines:

x=x+y: arithmetic operation
if x≥B/2 then x=x−B: or
if x<−B/2 then x=x+B: restrict result.

It can be seen that the result of adding or substracting two numbers within the range $(B/2 > x \geq -B/2)$ can result in an answer outside the range. When this occurs, it is called arithmetic overflow. The occurrence of overflow can be easily determined in BASIC with the following program:

overflow=0
x=x+y: arithmetic operation
if x≥B/2 then overflow=1: or
if x<−B/2 then overflow=1: detect overflow.

An overflow condition like this is usually detected in a condition code register of most conventional microcomputers.

The following program assumes that arithmetic operations are restricted to the range $B/2 > x \geq -B/2$ and that an overflow is detectable. Line numbers have only been assigned to lines of the following program which correspond to blocks of the flow charts in FIGS. 5a and 5b.

```
            ZERO CROSSING ROUTINE
    100     READ TIMER
            REF = −REF
            LAST 2 = LAST 1
            LAST 1 = LAST
            LAST = TIMER
            IF (LAST − LAST 2) > −43 THEN 117
            TEMP = 3 * LAST 1
            ERROR = TEMP − PL1800
    109     IF ERROR >0 THEN 111
            PL1800 = PL1800 + K18
            GO TO 112
    111     PL1800 = PL1800 − K18
    112     IF ABS (ERROR) > 10 THEN 115
            DOSCNT = DOSCNT + 1
            GO TO 116
    115     DOSCNT = DOSCNT −1
    116     GO TO 127
    117     TEMP = 2* LAST 1
    118     ERROR = TEMP − PL1200
            IF ERROR >0 THEN 122
            PL 1200 = PL1200 + K12
            GO TO 123
    122     PL1200 − PL1200 − K12
    123     IF ABS (ERROR) > 10 THEN 126
            DOSCNT = DOSCNT + 1
            GO TO 127
    126     DOSCNT = DOSCNT −1
    127     IF (TIMER − SAMPNT) <0 THEN RETURN
            GO TO SAMPLE POINTER ROUTINE
              SAMPLE POINTER ROUTINE
    200     READ SAMPNT
            BITEDGE = PL1800 − PL1200
            ERROR = SAMPNT − BIT EDGE
            IF ERROR > 0 THEN 208
            IF ERROR <−43 THEN 212 (−60°)
            REF = −REF
            *SAMPNT = SAMPNT + 341
            GO TO 215
    208     IF ERROR > 43 THEN 212 (+60°)
            REF = −REF
            *SAMPNT = SAMPNT + 171
            GO TO 215
    212     TEMP = 3* SAMPNT
            ERROR = TEMP − (PL1800 + 128) (+180°)
            *SAMPNT = SAMPNT + 256 + (3/4) *ERROR
    215     DEMOD = 2 * DEMOD
            IF REF <0 THEN 219
            DEMOD = DEMOD +1
    219     RETURN
```

*NOTE: Each line so denoted above is NOT modulo arithmetic.

I claim:

1. A method of recovering a binary bit stream from an incoming signal containing binary data at a predetermined bit rate, each bit represented by one of two signaling tones having alternating polarity with successive zero-crossings, the frequency difference between the two signaling tones being one-half the bit rate, and the phase of the binary data signal being continuous at the boundaries between bits, the method comprising the steps of:

establishing one sample point per bit period essentially midway between the successive zero-crossings of the higher of the two signaling tones and close to midway between the successive zero-crossings of the lower of the two signaling tones; and detecting the polarity of the incoming signal at said sample point and assigning a first bit state for a positive polarity and a second bit state for a negative polarity of the incoming signal thereby recovering a binary bit stream from the incoming signal with improved noise immunity.

2. The method according to claim 1, wherein said step of establishing one sample point per bit period includes the steps of:

detecting a time occurrence of each zero-crossing;
measuring an interval of time resulting between occurrences of zero-crossings and calculating a bit edge reference based upon said measured interval of time; and
setting the sample point within predetermined limits by minimizing any difference in time between said sample point and said bit edge reference prior to performing said detecting step.

3. The method according to claim 1, wherein said step of establishing a sample point includes the steps of:
detecting a time occurrence of each zero-crossing;
measuring an interval of time resulting between occurrences of zero-crossings and updating one of two dynamic reference means, such as phase-locked loops, operating at each one of the two signaling tone frequencies; and
determining whether the sample point has occurred and adjusting the sample point's next occurrence in time by advancing the sample point forward a predetermined amount.

4. The method according to claim 1, wherein said step of detecting and assigning includes the steps of:
utilizing said predetermined bit rate to establish a preferred sample point in time for decoding the incoming signal with one sample per bit cycle; and
decoding the incoming signal in real time without further computation by merely detecting the polarity of the incoming signal at the sample point.

5. A method of recovering a binary bit stream from an incoming signal containing binary data at a predetermined bit rate, each bit represented by one of two signaling tones having alternating polarity with successive zero-crossings, the frequency difference between the two signaling tones being one-half the bit rate, and the phase of the binary data signal being continuous at the boundaries between bits, the method comprising the steps of:
detecting a time occurrence of each zero-crossing;
measuring an interval of time resulting between occurrences of zero-crossings and calculating a bit edge reference based upon said measured interval of time;
setting the sample point to be essentially midway between successive zero-crossings of the higher of the two signaling tones and 60 degrees to 90 degrees away from the zero-crossings of the lower of the two signaling tones; and
detecting the polarity of the incoming signal at said sample point and assigning a first bit state for a positive polarity and a second bit state for a negative polarity of the incoming signal thereby recovering a binary bit stream from the incoming signal with improved noise immunity.

6. The method according to claim 5, wherein said step of setting the sample point includes the steps of:
adjusting the sample point forward in time by 360°±120° if the sample point and the bit edge have an absolute difference exceeding a value in the range of 60°-70°; and
reducing any difference between said bit edge reference and said sample point by a factor of three fourths after a zero-crossing and prior to performing said detecting step.

7. The method according to claim 5, wherein said step of setting the sample point includes the steps of:
adjusting the sample point forward in time by 360°±120° if the sample point and the bit edge have an absolute difference exceeding a value in the range of 60°-70°; and
reducing any difference between said bit edge reference and said sample point by exactly the difference therebetween after a zero-crossing and prior to performing said detecting step.

8. The method according to claim 6, wherein said step of adjusting the sample point includes adjusting the sample point forward in time by 360°±120° if the sample point and the bit edge have an absolute difference of at least 70° for providing approximately 10° margin against phase jitter.

9. The method according to claim 7, wherein said step of adjusting the sample point includes adjusting the sample point forward in time by 360°±120° if the sample point and the bit edge have an absolute difference of at least 70° for providing approximately 10° margin against phase jitter.

10. A maximum distance from zero-crossing demodulator for recovering a binary bit stream from an incoming signal containing binary data at a predetermined bit rate, each bit represented by one of two signaling tones having alternating polarity with successive zero-crossings, the frequency difference between the two signalingtones being one-half the bit rate, and the phase of the data signal being continuous at the bit boundaries between bits, the maximum distance from zero-crossing demodulator comprising:
means for establishing one sample point per bit period essentially midway between the successive zero-crossings of the higher of the two signaling tones and close to midway between the successive zero-crossings of the lower of the two signaling tones; and
means for detecting the polarity of the incoming signal at said sample point and assigning a first bit state for a positive polarity and a second bit state for a negative polarity of the incoming signal thereby recovering a binary bit stream from the incoming signal with improved noise immunity.

11. The demodulator according to claim 10, wherein said means for establishing a sample point includes a microcomputer programmed to comprise in combination:
means for detecting a time occurrence of each zero-crossing;
means for measuring an interval of time resulting between occurrences of zero-crossings and updating one of two dynamic reference means, such as phase-locked loops, operating at each one of the two signaling tone frequencies; and
means for determining whether the sample point has occurred and adjusting the sample point's next occurrence in time by advancing the sample point forward a predetermined amount.

12. The demodulator according to claim 10, wherein said means for detecting and assigning includes a microcomputer programmed to comprise in combination:
means for utilizing said predetermined bit rate to establish a preferred sample point in time for decoding the incoming signal with one sample per bit cycle; and
means for decoding the incoming signal in real time without further computation by merely detecting the polarity of the incoming signal at said preferred sample point.

13. A maximum distance from zero-crossing demodulator for recovering a binary bit stream from an incoming signal containing binary data at a predetermined bit rate, each bit represented by one of two signaling tones having alternating polarity with successive zero-crossings, the frequency difference betwen the two signaling tones being one-half the bit rate, and the phase of the data signal being continuous at the bit boundaries between bits, the maximum distance from zero-crossing demodulator comprising:

means for detecting a time occurrence of each zero-crossing;

means for measuring an interval of time resulting between occurrences of zero-crossings and updating one of two dynamic reference means, such as phase-locked loops, operating at a respective one frequency of the two signaling tones; and means for setting the sample point to be essentially midway between successive zero-crossings of the higher of the two signaling tones and 60 degrees to 90 degrees away from the zero-crossings of the lower of the two signaling tones; and means for detecting the polarity of the incoming signal at said sample point and means for assigning a first bit state for a positive polarity and a second bit state for a negative polarity of the incoming signal thereby recovering a binary bit stream from the incoming signal with improved noise immunity.

14. The demodulator according to claim 13, wherein said means for setting the sample point includes:

means for adjusting the sampling point forward in time by 360°±120° if the sampling point and the bit edge have an absolute difference exceeding a value in the range of 60°–70°; and means for reducing any difference between said bit edge reference and said sample point by a factor of three-fourths after a zero-crossing and prior to activating said means for detecting.

15. The demodulator according to claim 13, wherein said means for setting the sample point includes:

means for adjusting the sampling point forward in time by 360°±120° if the sampling point and the bit edge have an absolute difference exceeding a value in the range of 60°–70°; and means for reducing any difference between said bit edge reference and said sample point by exactly the difference therebetween after a zero-crossing and prior to activating said means for detecting.

16. The demodulator according to claim 14, wherein said means for adjusting the sampling point includes means for adjusting the sampling point forward in time by 360°±120° if the sampling point and the bit edge have an absolute difference of at least 70° for providing approximately 10° margin against phase jitter.

17. The demodulator according to claim 15, wherein said means for adjusting the sampling point includes means for adjusting the sampling point forward in time by 360°±120° if the sampling point and the bit edge have an absolute difference of at least 70° for providing approximately 10° margin against phase jitter.

* * * * *